United States Patent [19]

Bailey

[11] Patent Number: 4,503,432

[45] Date of Patent: Mar. 5, 1985

[54] ADAPTIVE THRESHOLD DETECTION UTILIZING A TAPPED CHARGE TRANSFER DEVICE DELAY LINE

[75] Inventor: Walter H. Bailey, Johnson City, Tenn.

[73] Assignee: The United States of America as represented by the Secretary of the Army, Washington, D.C.

[21] Appl. No.: 331,847

[22] Filed: Dec. 17, 1981

[51] Int. Cl.³ .......................... G01S 7/30; G01S 9/02
[52] U.S. Cl. .................. 343/7 A; 343/5 CF; 343/7.7
[58] Field of Search .............. 343/5 CF, 7 A, 7.7, 343/5 DP, 5 CM, 5 T

[56] References Cited

U.S. PATENT DOCUMENTS

| | | | |
|---|---|---|---|
| 3,942,034 | 3/1976 | Buss | 343/7.7 X |
| 3,995,270 | 11/1976 | Perry et al. | 343/7 A |
| 4,016,567 | 4/1977 | Buss | 343/5 DP X |
| 4,045,795 | 8/1977 | Fletcher et al. | 343/5 CM |
| 4,095,222 | 6/1978 | Mooney, Jr. | 343/7 A |
| 4,137,532 | 1/1979 | Taylor, Jr. et al. | 343/5 CF X |
| 4,213,127 | 7/1980 | Cole | 343/7 A X |
| 4,249,177 | 2/1981 | Chen | 343/7 A |

OTHER PUBLICATIONS

Skolnik, Merrill I., Radar Handbook, pp. 2-16, Lines 20-25.

*Primary Examiner*—Maynard R. Wilbur
*Assistant Examiner*—Brian Steinberger
*Attorney, Agent, or Firm*—Anthony T. Lane; Jeremiah G. Murray; Edward Goldberg

[57] ABSTRACT

A constant false alarm rate is achieved in a moving-target-indicator radar by controlling the threshold in doppler channels according to the level of clutter in range gates near the range rate being examined for the presence of a target. Processing is simplified by using analog signals in charge coupled devices for target detection.

5 Claims, 2 Drawing Figures

ADAPTIVE THRESHOLD DETECTION UTILIZING A TAPPED CHARGE TRANSFER DEVICE DELAY LINE

GOVERNMENT INTEREST

The Government has rights in this invention pursuant to Contract No. DAAB07-76-C-0912 awarded by the Department of the Army.

BACKGROUND OF THE INVENTION

The present invention relates to radar and, in particular, to moving-target indicator (MTI) radar employing signal changes due to target velocity to discriminate a target from background clutter.

As used herein, moving-target indicator radar is a general term which encompasses low PRF systems of the delay canceller or fast Fourier transform types and high PRF types sometimes known as pulse doppler. The unifying characteristic of MTI radar is the use of a difference in the signal returned from a target moving at normal target speeds as compared to background clutter or noise.

The doppler shift in the received frequency of a radar returned from a target moving relative to the radar system is given by $fd = 2v_r/\lambda$ Where:
$v_r$ = relative velocity
fd = doppler shift
$\lambda$ = wavelength A stationary radar system having its field of view generally horizontal searching or tracking ground based or airborne moving objects obtains returns not only from the target object itself, but also from the surface of the earth, objects both natural and man-made extending above the earth and from particles, principally water and ice, in the air. Early radar systems employing simple cancellers stored the radar return from one pulse and subtracted corresponding portions of the radar return received from a second pulse. The theory being applied is that the radar returned from stationary objects is the same in successive pulses and, therefore, the subtraction substantially eliminates such stationary objects leaving only moving objects to be displayed. More advanced systems used the returns from more than two pulses and employed various types of transforms to enhance the detectability of moving targets in the presence of clutter. Such systems permitted detection of the moving targets in the presence of background clutter having many times the return signal strength as the target itself. The ratio of clutter signal strength to detectable target signal strength is known as "subclutter visibility". Moving target indicator systems have given subclutter visibilities in the range of 20 to 30 decibels.

Even in stationary radar systems, the clutter itself is not necessarily stationary and, therefore, is not perfectly cancelled by canceller type MTI systems. That is, in addition to the moving target and stationary ground returns, the return signal contains components from wind-moved vegetation such as trees, etc., and from wind-driven moisture such as rain storms.

Doppler frequency signal processors overcome many of these difficulties and also permit the use of MTI systems in moving platforms such as aircraft wherein a doppler component is produced in the clutter return due to the motion of the radar-carrying platform. In such systems, the radar return is frequency filtered into a number of parallel channels. The principal ground return is often employed in a clutter tracker to control a local oscillator which positions the frequency of the stationary ground return at a predetermined value so that moving target and moving clutter returns will fall within predictable frequency bands.

Radar systems normally determine the presence or absence of a target according to whether the returned signal strength exceeds or fails to exceed a threshold level. The setting of such a threshold level is always a compromise in radar systems. If the threshold is set too low, noise present in the signal will exceed the threshold even without the presence of a target. Such false indications of target are called false alarms. Conversely, if the threshold is set too high, even signals containing returns from real targets may not exceed the threshold and, therefore, the probability of detecting the target is degraded.

It is thus seen that false alarms and probability of detection are mutually antagonistic.

The power returned from a target in a monostatic radar (transmitter and receiver in the same location) is given by $$P_r = \frac{P_t G_t A_r \sigma}{(4\pi R^2)^2}$$

Where:
$P_r$ = power received
$P_t$ = transmitter power
$G_t$ = transmit antenna gain
$A_r$ = receive antenna effective capture area
$\sigma$ = radar cross section
R = range to target When the same antenna is employed for both transmitting and receiving, the receipt of power is given by the following:

$$P_r = \frac{P_t C^2 \lambda^2}{(4\pi)^3} \frac{\sigma}{R^4}$$

Where:
$P_r$ = received power
$P_t$ = transmitter power
R = range to target
G = antenna gain
$\sigma$ = radar cross section Except for radar cross section $\sigma$ and range, the right-hand side of the last equation can be considered a constant. As is well known, the radar cross section of a target is strongly variable with target geometry and orientation. The same is true for background and foreground clutter returns. This, of course, complicates the setting of threshold level for target detection.

The inverse fourth power range relationship also complicates the setting of a detection threshold level. That is, as a packet of radar energy travels outward from the antenna, the returns received back at the antenna vary as a function of the inverse fourth power of range.

In electronic counter-countermeasure systems, wherein intentional jamming is employed to degrade the detection probability, the false alarm rate can increase to an intolerable level such that the radar system becomes unusable. In operator controlled systems, where an operator monitors a radar display (essentially acting as a human threshold), in the presence of jamming, the operator turns down the gain of the radar system to a level which reduces the false alarm rate to a level he can tolerate. In automatic systems, the average noise level may be used to provide automatic gain control to maintain the false alarm rate at a constant level. Such a radar system is known as a constant false alarm receiver (CFAR). Since automatic CFAR reacts faster than a human, it is superior to the attempt of an operator to keep the false alarm rate constant.

The same result can be obtained by automatically raising the threshold level at which target detection is recognized. It should be understood that either automatic method of maintaining a constant false alarm rate reduces the probability of detection. Furthermore, the gain or threshold control may not be controlled rapidly enough to account for the inverse fourth power of range factor in the return signal.

OBJECTS AND SUMMARY OF THE INVENTION

Accordingly, it is an object of the present invention to provide an apparatus for automatically setting the threshold level for target detection in an MTI radar system which optimizes probability of detection while maintaining a substantially constant false alarm rate.

It is a further object of the invention to employ clutter in range cells adjacent to a range cell being investigated for controlling the threshold at which target detection is recognized.

It is a further object of the invention to provide a threshold setting apparatus in a doppler radar system which employs a charge transfer device for processing doppler channels and for continuously comparing the background signal level in range cells adjacent a range cell being investigated to determine whether a target exists in the range cell being investigated.

It is a further object of the invention to provide the capability to incorporate a guard range cell on either side of the range cell being investigated for the presence of a target to accommodate extended targets providing returns in adjacent range cells or a small target at a range corresponding to the split between adjacent range cells.

It is a further object of the invention to sequentially process returns from all range bins of interest during each pulse repetition interval (PRI) of the radar by sequentially transferring signal samples corresponding to the range bins through a charge transfer device which accesses the stored signal samples in a non-destructive manner.

According to an aspect of the invention, there is provided a method of establishing a detection threshold in a radar system, wherein a received radar signal is processed to provide at least one doppler channel containing an analog signal, comprising storing a plurality of successive samples contiguous in time of the analog signal, weighting at least one of the samples received before a target sample with at least one of the samples received after the target sample to produce a detection threshold, and comparing the target sample with the detection threshold to determine whether a target radar return is contained in the target sample.

According to a further aspect of the present invention, there is provided an apparatus for establishing a detection threshold in a radar system, of the type in which a received radar signal is examined for the presence of a radar return from a target, comprising a radar receiver effective to produce at least one analog signal related to the radar signal, means for temporarily storing a plurality of samples contiguous in time of the analog signal, an intermediate one of the samples being a target sample, means for weighting at least one of the samples received before the target sample with at least one of the samples received after the target sample to produce a detection threshold, and means for comparing the target samples with the detection threshold to determine whether the target sample contains a radar return from a target.

According to a feature of the present invention, the CFAR detection process described in this invention may be utilized with any conventional radar system independently of MTI or doppler processing. MTI or doppler processing provide an additional means of discriminating between desired and undesired target return signals based upon the doppler frequency shift imparted by the motion of the target relative to the radar. MTI or doppler processing shall normally be included in the preferred embodiment of this invention.

According to a further feature of the present invention, there is provided an apparatus for establishing a detection threshold in a moving target indicator radar system, of the type in which a received radar signal is examined for the presence of a radar return from a target, comprising a radar receiver effective to produce an analog signal related to the radar signal, means for separating the analog signal into a plurality of analog doppler signals, at least one charge transfer device including at least five storage elements, means for feeding a first sample of one of the analog doppler signals into a first of the storage elements, means for transferring the first sample to a second of the storage elements and for feeding a second sample of the analog doppler signal into the first of the storage elements, means for continuing to transfer previously stored samples to elements along the charge transfer device and for feeding new samples into the first storage element, a sample in a last of the storage elements being replaced by the charge in a next to last storage element, one of the storage elements intermediate of the charge transfer device being a target storage element whose content is examined after each transfer to determine whether it contains a sample indicative of a target, means for summing samples in a plurality of storage elements stored before storage of a sample in the target storage element and samples in a plurality of storage elements stored after storage of the sample in the target storage element to produce a threshold signal which is responsive to an average received signal at ranges in the vicinity of a range corresponding to the sample stored in the target storage element, the means for summing omitting samples stored in storage elements immediately adjacent the target storage element and means for comparing the sample in the target storage element with the threshold signal to determine whether the sample in the target storage element is a target signal.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
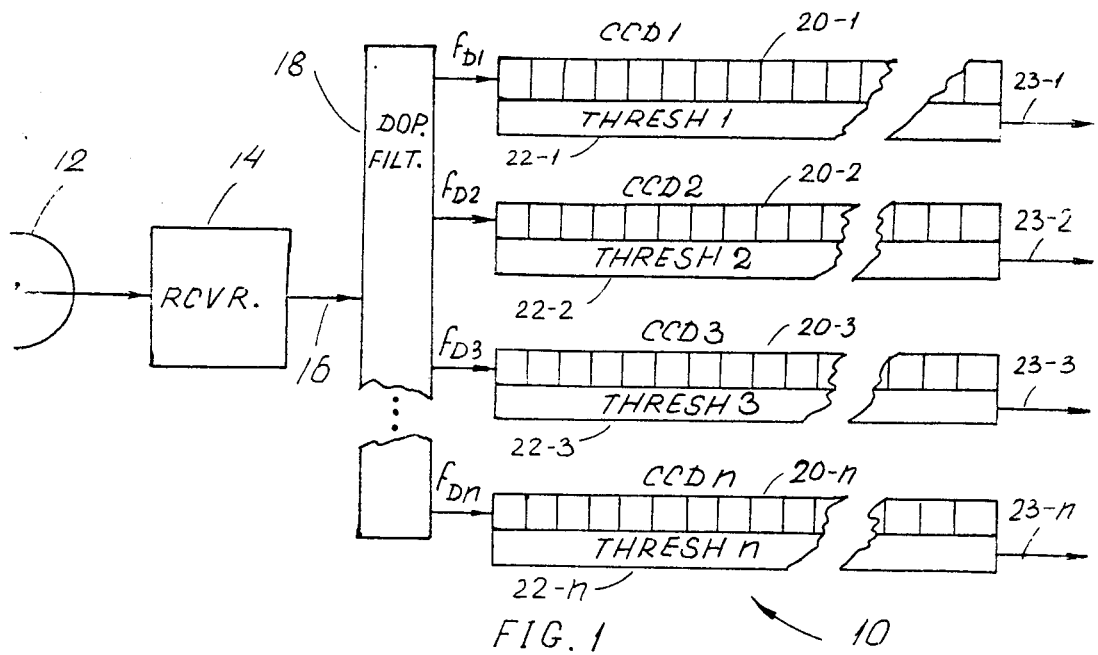
FIG. 1 shows a simplified block diagram of a radar system employing adaptive threshold detection according to an embodiment of the present invention.

Referring now to FIG. 1, there is shown generally at 10 a radar system employing an embodiment of the present invention. A radar antennar 12, which may be of any convenient type but is shown as a dish-type antenna for concreteness, acts as a receiving antenna for collecting radar signals reflected from a target (not shown) as well as clutter. Radar antenna 12 may also be employed for transmitting a signal and, in fact, such a system is the preferred embodiment. The transmitting portion of radar system 10 is omitted since showing and explaining that portion of radar system 10 is not necessary for an understanding of the present invention.

Radar echo signals received on radar antenna 12 are processed in a conventional radar receiver 14 to produce an amplified and detected analog signal on a line 16 which is applied to a doppler filter bank 18. Doppler filter bank 18 filters the incoming analog signal into a plurality of frequency channels $f_{D1}, f_{D2} \ldots f_n$. The number of doppler channels is dependent upon the desired doppler frequency resolution of the system. Each doppler frequency signal is applied to an input of its respective charge coupled device CCD1 . . . CCDn, 20-1 to 20-n. Each charge coupled device 20-1 to 20-n has a corresponding threshold 22-1 to 22-n associated with it. Each threshold 22-1 to 22-n provides an output 23-1 to 23-n indicating whether or not a radar return has been received that is characteristic of a target.

Figure 2:
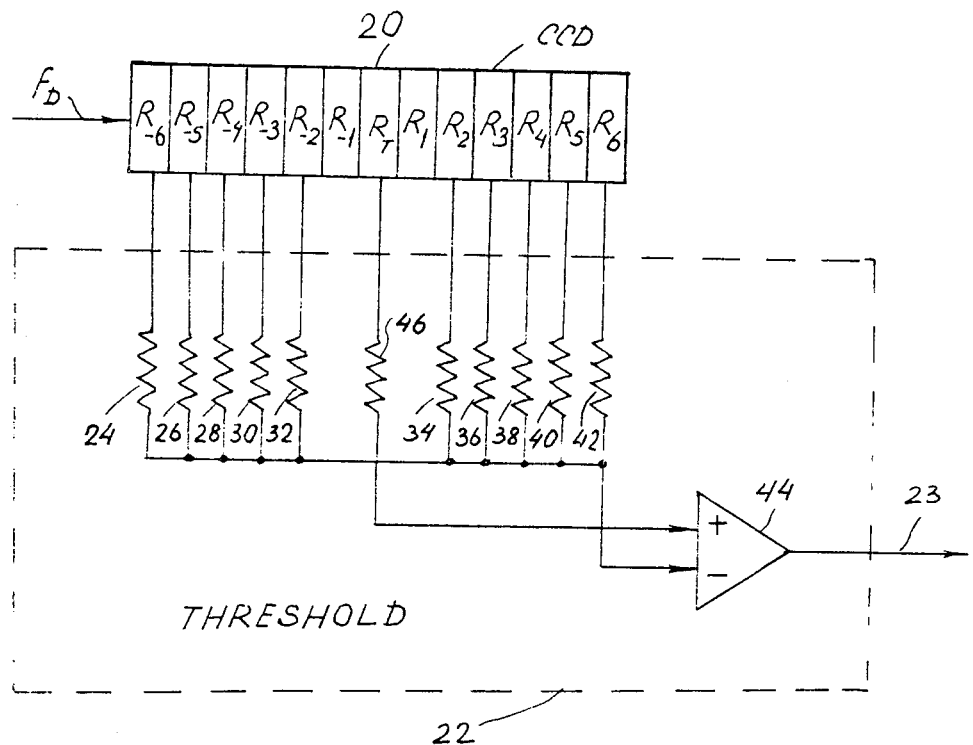
FIG. 2 is a detailed block diagram of a CCD and a related threshold of FIG. 1.

Referring now to FIG. 2, one of the CCD's, herein identified by reference 20, receives an analog doppler channel signal $f_D$ at a first range bin $R_{-6}$. The analog doppler signal is integrated for a short time in the capacitive storage device range bin $R_{-6}$ until a clock time at which the signal previously stored in range bin $R_{-6}$ is transferred to range bin $R_{-5}$ and a new sample of the doppler channel analog signal $f_D$ is stored in entry range bin $R_{-6}$. This process is repeated during the reception of the radar signal following each transmitted pulse. The frequency of the clock signal transferring or stepping the charges from left to right in CCD 20 determines the range resolution of the system. That is, the range resolution can be no better than the distance that a packet of radio energy can travel in free space during the interval between clock pulses.

Although not intended to be limiting, CCD 20 includes a target range bin $R_T$ with six range bins or either side of it, $R_{-6}$ to $R_{-1}$ and $R_1$ to $R_6$. It would be clear to one skilled in the art that, after a period of time long enough for all range bins to have had a charge transferred into them, freezing the operation of CCD 20 and examining the contents thereof would provide a representation of the signal strength received over thirteen samples or range.

The charges contained in range bins $R_{-6}$ to $R_{-2}$ and $R_2$ to $R_6$ are summed and/or weighted in resistors 24, 26, 28, 30, 32, 34, 36, 38, 40 and 42. The summed and/or weighted result is applied to the minus input of an amplifier 44. The charge in target range bin $R_T$ is applied through a resistor 46 to a plus input of amplifier 44. Note that range bins $R_{-1}$ and $R_{-1}$ immediately adjacent target range bin $R_T$ are not connected to the summing or weighting network.

When the signal in target range bin $R_T$ exceeds the summed and/or weighted signal fed to the minus input of amplifier 44, a target present signal is transmitted on line 23 to display, alarm or storage devices (not shown). Weighting resistors 24-32 and 34-42 may all have the same value or, alternatively, may have a shaped response for optimizing probability of detection with acceptable false alarm rate.

The weighted outputs or range bins preceding and following target range bin $R_T$ to establish the detection threshold based on the clutter signal level therein, automatically compensates for the inverse fourth power of range as well as for varying cross section of the clutter. As the received analog doppler channel signal $f_D$ cycles through CCD 20 and is discarded once it has served its purpose in range bin $R_6$, the contents of target range bin $R_T$ are constantly examined to determine whether the charge contained therein is large enough to cross the threshold established by the remaining range bins.

By leaving immediately adjacent range bins $R_{-1}$ and $R1$ unconnected, guard bands are established on either side of the target range bin to avoid errors due to targets of large extent covering several range bins to a target straddling two range bins.

Although only one doppler channel has been described in the preceding, it would be understood that each threshold 22-1 to 22-n may contain dynamic threshold setting apparatus as shown in FIG. 2 depending upon the clutter level in adjacent range bins of that particular doppler channel. Alternatively, a single one of thresholds 22-1 to 22n may be employed to develop the weighted clutter signal from a single doppler channel and this weighted clutter signal may then be employed as the threshold signal in all of the remaining thresholds 22-1 to 22n.

Logarithmic weighting may be implemented by conditioning the signal with a logarithmic amplifier (not shown) prior to feeding the signal to CCD 20.

It should be clear to one skilled in the art that the present technique is not limited to radar detection but, instead may be employed in communications and other applications as well.

Having described specific embodiments of the invention with respect to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for establishing a detection threshold in a radar system of the type in which a received radar signal is examined for the presence of a radar return from a target, comprising:
   a radar receiver effective to produce at least one analog signal related to said radar signal;
   storage means for temporarily storing a plurality of successive signal samples contiguous in time of said analog signal including an intermediate storage means for storing a target signal sample, at least two of said signal samples being received before said target sample and at least two others of said samples being received after said target sample;
   means for weighting at least one of said samples received before said target sample with at least one of said samples received after said target sample to produce a detector threshold, said means for weighting including a plurality of resistors connected between respective storage means and. a common output terminal and having no connections between storage means immediately before and after said target sample to said common terminal to provide guard ranges on each side of said target sample; and means for comparing said target sample with said detector threshold to determine whether said target sample contains a radar return from a target.

2. Apparatus according to claim 1, wherein said means for temporarily storing includes a charge transfer device.

3. Apparatus according to claim 2, wherein said charge transfer device is a charge coupled device.

4. Apparatus according to claim 3, wherein said charge coupled device includes means for temporarily storing at least five samples contiguous in time, said guard ranges avoiding interference with said detection threshold from extended targets and targets occurring at an edge of said target sample.

5. Apparatus for establishing a detection threshold in a moving target indicator radar system of the type in which a received radar signal is examined for the presence of a radar return from a target, comprising:

a radar receiver effective to produce an analog signal related to said radar signal;

means for separating said analog signal into a plurality of analog doppler signals;

at least one charge transfer device including at least five storage elements;

means for feeding a first sample of one of said analog doppler signals into a first of said storage elements;

means for transfering said first sample to a second of said storage elements and for feeding a second sample of said analog doppler signal into said first of said storage elements;

means for continuing to transfer previously stored samples to elements along said charge transfer device and for feeding new samples into said first storage element, a sample in a last of said storage elements being replaced by the charge in a next to last storage element;

one of said storage elements intermediate of said charge transfer device being a target storage element whose content is examined after each transfer to determine whether it contains a sample indicative of a target;

means for summing samples in a plurality of storage elements stored before storage of a sample in said target storage element and samples in a plurality of storage elements stored after storage of said sample in said target storage element to produce a threshold signal which is responsive to an average received signal at ranges in the vicinity of a range corresponding to said sample stored in said target storage element, said means for summing including a plurality of resistors connected between respective storage elements and a common output terminal and having no connections between storage elements immediately adjacent said target storage element to said common output terminal to provide guard bands on each side of said target element; and means for comparing said sample in said target storage element with said threshold signal to determine whether said sample in said target storage element is a target signal, said means for comparing including a first input from said common output terminal and a second input from said target storage element, said means for comparing providing an output signal when said sample signal from said target element exceeds said threshold signal.

* * * * *